(12) United States Patent
Serizawa et al.

(10) Patent No.: US 7,484,071 B2
(45) Date of Patent: Jan. 27, 2009

(54) METHOD FOR ALLOCATING STORAGE AREA TO VIRTUAL VOLUME

(75) Inventors: Kazuyoshi Serizawa, Machida (JP); Shinji Morita, Kamakura (JP); Naoko Iwami, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 26 days.

(21) Appl. No.: 11/819,775

(22) Filed: Jun. 29, 2007

(65) Prior Publication Data

US 2007/0255925 A1 Nov. 1, 2007

Related U.S. Application Data

(63) Continuation of application No. 11/312,393, filed on Dec. 21, 2005, now Pat. No. 7,257,694, which is a continuation of application No. 10/825,158, filed on Apr. 16, 2004, now Pat. No. 7,213,124.

(30) Foreign Application Priority Data

May 28, 2003  (JP) .............................. 2003-150082
Mar. 8, 2004  (JP) .............................. 2004-063392

(51) Int. Cl.
*G06F 12/00* (2006.01)
(52) U.S. Cl. ...................... 711/202; 711/111; 711/112; 711/114; 711/170; 711/221
(58) Field of Classification Search ................ 711/202, 711/221, 170, 111, 112, 114
See application file for complete search history.

(56) References Cited

U.S. PATENT DOCUMENTS 5,193,184 A   3/1993  Belsan et al. ................... 711/4
5,394,532 A   2/1995  Belsan et al. ................ 711/114
5,649,152 A   7/1997  Ohran et al. ................. 711/114

(Continued)

FOREIGN PATENT DOCUMENTS

JP   2000-242434   9/2000

(Continued)

OTHER PUBLICATIONS

"9.9 Extending a logical volume", http://www.linux.org/docs/ldp/howto/LVM-HOWTO/x592.html.

(Continued)

*Primary Examiner*—Stephen C Elmore
(74) *Attorney, Agent, or Firm*—Mattingly, Stanger, Malur & Brundidge, P.C.

(57) ABSTRACT

In a system where a storage device is coupled to a computer, a storage area in the storage device is efficiently allocated to the computer. The system comprises a virtualization apparatus to be coupled to the virtualization apparatus. The virtualization apparatus, responding to a request from the computer, issues a notice to the effect that a predetermined size of virtual volume has been allocated to the computer. The virtualization apparatus, upon receiving an access request from the computer to the virtual volume, allocates storage areas existing in a plurality of storage devices to the virtual volume, converts the access request received from the computer to an access request addressed to a storage device having the storage devices allocated to the virtual volume, and transmits the converted access request to the storage device.

19 Claims, 6 Drawing Sheets

U.S. PATENT DOCUMENTS

| | | | | |
|---|---|---|---|---|
| 6,032,224 | A | 2/2000 | Blumenau | 711/117 |
| RE36,989 | E | 12/2000 | White | 711/118 |
| 6,725,328 | B2 | 4/2004 | Kano et al. | 711/112 |
| 6,799,245 | B1 | 9/2004 | Kochiya | 711/114 |
| 6,850,955 | B2 | 2/2005 | Sonoda et al. | 707/200 |
| 6,883,073 | B2 * | 4/2005 | Arakawa et al. | 711/162 |
| 6,898,670 | B2 | 5/2005 | Nahum | 711/114 |
| 6,976,134 | B1 | 12/2005 | Lolayekar et al. | 711/148 |
| 7,222,172 | B2 * | 5/2007 | Arakawa et al. | 709/224 |
| 2002/0026558 | A1 | 2/2002 | Reuter et al. | 711/114 |
| 2002/0091898 | A1 | 7/2002 | Matsunami et al. | 711/114 |
| 2002/0112113 | A1 | 8/2002 | Karpoff et al. | 711/209 |
| 2002/0120822 | A1 | 8/2002 | Li et al. | 711/171 |
| 2003/0079018 | A1 | 4/2003 | Lolayekar et al. | 709/226 |
| 2003/0079019 | A1 | 4/2003 | Lolayekar et al. | 709/226 |
| 2003/0093541 | A1 | 5/2003 | Lolayekar et al. | 709/230 |
| 2003/0093567 | A1 | 5/2003 | Lolayekar et al. | 709/246 |
| 2003/0145167 | A1 | 7/2003 | Tomita | 711/114 |
| 2003/0191904 | A1 | 10/2003 | Iwami et al. | 711/147 |
| 2003/0236945 | A1 | 12/2003 | Nahum | 711/114 |

FOREIGN PATENT DOCUMENTS

| | | |
|---|---|---|
| JP | 2000-298556 | 10/2000 |
| WO | WO 03/027886 A1 | 4/2003 |
| WO | WO 03/030431 A2 | 4/2003 |
| WO | WO 03/030449 A1 | 4/2003 |

OTHER PUBLICATIONS

Wilkes et al., "The HP AutoRAID Hierarchical Storage System," p. 108-136, ACM, Feb. 1996.

Alvarez et al., "Minerva: An Automated Resource Provisioning Tool for Large-Scale Storage Systems," p. 483-518, ACM, Nov. 2001.

Buck et al., "The Storage Server as Virtual Volume Manager," pp. 79-86, Proceedings of the Twelfth IEEE Symposium on Mass Storage Systems, IEEE, Apr. 29, 1993.

Blunden et al., "Storage Networking Virtualization: What's it all about?" IBM Redbooks, First Edition, p. 1-110, Dec. 2000.

Hodge et al., "Managing Virtual Data Marts with Metapointer Tables," pp. 7, IEEE, Jan. 2003.

Milligan et al., "Online Storage Virtualization: The Key to Managing the Data Explosion," pp. 3052-3060, Proceedings of the 35$^{th}$ Annual Hawaii International Conference on System Sciences, IEEE, Jan. 10, 2002.

* cited by examiner

METHOD FOR ALLOCATING STORAGE AREA TO VIRTUAL VOLUME

This application is a continuation of U.S. application Ser. No. 11/312,393, filed Dec. 21, 2005, now U.S. Pat. No. 7,257,694, which is a continuation of U.S. application Ser. No. 10/825,158, filed Apr. 16, 2004, now U.S. Pat. No. 7,213,124, the entirety of which are incorporated herein by reference.

BACKGROUND OF THE INVENTION

The present invention refers to a technique for allocating a storage area of a storage system to a computer.

The switch that integrates a plurality of storage areas of a plurality of storage systems and allows them to access a computer as one storage area is disclosed in a patent document 1. According to the patent document 1, the switch is coupled to a plurality of storage systems and a host. The switch receives an access request from the host to an integrated logical unit comprising a plurality of storage areas (logical units) of the plurality of storage systems. Thereafter, the switch converts the access request received to an access request to a logical unit in which data to be accessed is stored, and transmits the access request thus converted to a storage system that has the logical unit.

On the other hand, a software technique, which, when the logical storage area allocated to a computer is extended, recognizes the extension of storage area at the part of a computer, is disclosed in a non-patent document 1.

Meanwhile, the patent document 1 implies the Japanese Patent Laid-open No. 2000-242434, and the non-patent document 1 implies the "LVM HOWTO9.9" which appears in the URL "http://www.linux.org/docs/1dp/howto/LVM-HOWTO/x592.html".

SUMMARY OF THE INVENTION

To expand the size of a storage area allocated to a computer, software to enable the computer to recognize expansion of the storage area size is required as shown in the non-patent document 1. Therefore, in a system wherein a computer is coupled to a storage system and the computer uses data stored in a storage area by accessing the storage area in the storage system, if the size of the storage area (accessible from the computer) allocated to the computer is to be modified, it is necessary to pre-install the software in the computer.

However, if a plurality of computers are coupled to the storage system, it is necessary to add the software to all of such computers, and further, if such plurality of computers differ in their types, software associated with each type must be installed. Furthermore, when an operating system used for a computer is upgraded, it is necessary to update associating software, following the upgrade of the OS version. Accordingly, pre-installing software for the purpose of allowing the computer to recognize the size extension of a storage area results in increased management burdens and higher costs.

Now, the reason why the size of a storage area allocated to a computer is that data volume to be handled by the computer will increase and the necessary storage capacity will not be ensured by the initially allocated storage area. Therefore, when a large-size storage area is initially allocated to the computer, such capacity shortage will not occur and it is not necessary to expand the size of storage area allocated to the computer, thus eliminating necessity to pre-install the above-stated software in the computer. With such arrangement, however, when the computer is not using such a large volume of data, a free area will occur in the storage area allocated to the computer, thus causing a wasted storage area.

Given this situation, a system that enables to effectively allocate a storage area to a computer will be disclosed as follows:

The system has a virtualization apparatus to be coupled to a computer and a plurality of storage devices to be coupled to the virtualization apparatus. The virtualization apparatus issues a notification, responding to a request from the computer, that a predetermined size of virtual volume has been allocated to the computer. Upon receiving a request to access the virtual volume from the computer, the virtualization apparatus allocates storage areas that exist in a plurality of storage devices to a virtual volume, converts the access request received from the computer to an access request that is addressed to a storage device having the storage area allocated to the virtual volume, and then transmits the converted access request to the storage device.

According to the present invention, a storage area can be effectively allocated to a computer.

DESCRIPTION OF THE PREFERRED EMBODIMENTS

Hereinafter, preferred embodiments according to the present invention will be described with reference to the drawings. It should be noted, however, that the present invention is not limited to the preferred embodiments described hereunder.

First Embodiment

Figure 1:
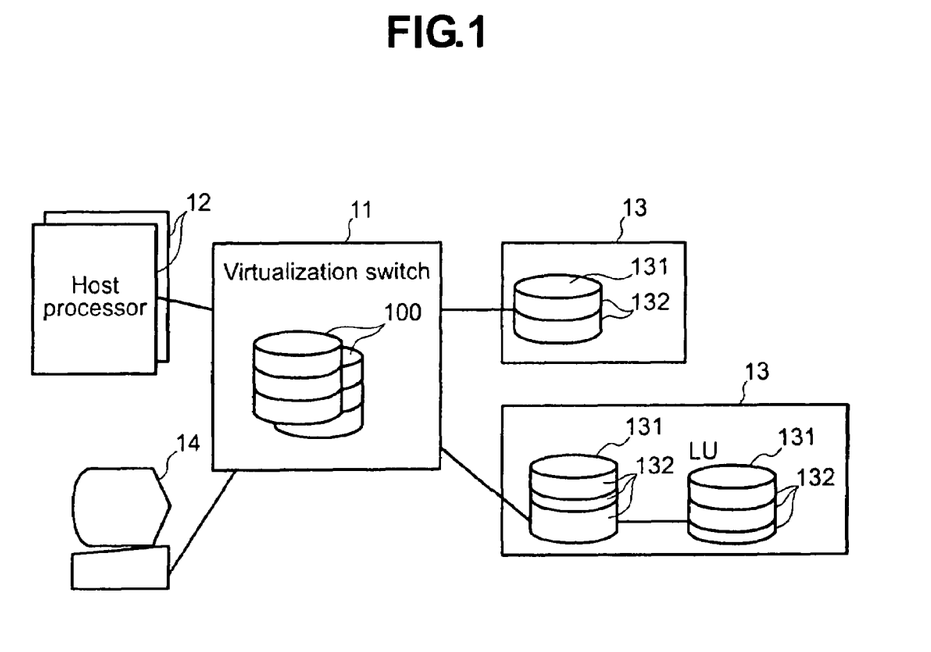
FIG. 1 is a diagram showing an example of overall configuration of a system to which the present invention is applied.

FIG. 1 is a diagram showing an example of overall configuration of a system to which the present invention is applied.

The system comprises at least one host processor 12, at least one storage device 13, a virtualization switch 11 and a management console 14.

The host processor 12 is a computer that uses data stored in the storage device 13. The host processor 12 may be a file server, which has a function to provide other computers that are not coupled to the virtualization switch 11 with a storage area provided by the virtualization switch 11.

The storage device 13 is a storage unit or a storage system. Here, a storage device shall imply a single storage device such as a hard disk or a DVD drive, and a storage system shall imply a storage sub-system which has a control unit or a disk device or disk devices such as one or a plurality of hard disk drives that are coupled to the control unit, and the control unit controls inputs and outputs to each disk device. Note that, however, that the storage system may be a disk array system in which a plurality of hard disk drive has a RAID configuration.

The storage device 13 has at least one logical unit (hereinafter referred to as an "LU") 131. The LU 131 is a logical storage area that is configured with physical storage areas in the storage device 13. For an equipment coupled to the storage device 13 such as the host processor, the LU 131 is recognized as a logically independent storage device.

In addition, the LU 131 is configured with a plurality of partial logical storage areas (hereinafter referred to as "real regions") 132. Each of the real regions 132 is associated with a physical storage area in the storage device 13. Size of the real region 132 is random, and the real region 132 is an area that has a series of addresses.

The virtualization switch 11 is coupled to another device (the host processor 13, the management console 14 or the storage device 13) via a communication line or a switch as illustrated, and the switch enables communication with other devices. Further, the virtualization switch 11 is a virtualization device which collectively manages one or a plurality of storage areas in one or a plurality of storage device 13 that is coupled to the virtualization switch 11 as one storage area. Collective management of one or a plurality of storage areas in one or a plurality of storage devices as one storage area shall be referred to as "virtualization". The virtualization switch 11, upon receiving a request to access a virtualized storage area from the host processor 12, identifies a storage area, in the storage device 13, that is associated with the virtualized storage area, converts the access request thus received to an access request to the identified storage area, and transmits the converted access request to the storage device 13. The process of an access request to a virtualized storage area by receiving an access request to a virtualized storage area and transmitting an access request to a storage area, in the storage device 13, that is associated with for the storage area shall be referred to as "providing a virtualized storage area".

With a communication line or a switch that is used between the virtualization switch 11 and the host processor 12, and between the virtualization switch 11 and the storage device 13, a protocol such as a fibre channel is used, provided that such communication line or switch to be used may be a communication line or a protocol that is used for a local area network, etc.

The virtualization switch 11 is coupled between the host processor 12 and the storage device 13 and has a function to transfer a command issued by the host processor 12 to the storage device 13. Incidentally, a virtual storage area that is provided by the virtualization switch 11 to the host processor 12 (i.e., a storage area virtualized by the virtualization switch) shall be referred to hereunder as a virtual volume 100.

The virtual volume 100 is associated with at least one real region 132 by the virtualization switch 11. The virtualization switch 11 is capable of providing a plurality of virtual volumes 100 to the host processor 12, etc. Each of the virtual volumes 100 is provided with a unique identifier (hereinafter referred to as a "virtual volume identifier") within the virtualization switch 11 which is provided to identify virtual volumes. In addition, a storage area of each virtual volume 100 is provided with a series of addresses (hereinafter also referred to as "virtual addresses"). The host processor 12 designates a virtual address which indicates a virtual volume identifier and a location in the virtual volume 100, instead of directly designating the real region 132 in the LU 131 of the storage device 13, and issues an access request. The virtualization switch 11 identifies, on the virtual volume identifier and the virtual address, a real region 132 associated therewith in the LU 131, and issues a request for access to the identified real region 132. Consequently, the host processor 12 is enabled to use data that is stored in the real region 132 of the storage device 13 by using a virtual volume identifier and a virtual address that indicates a storage area in the virtual volume 100.

The management console 14 is a computer that is used by a system administrator to create (or set up) the virtual volume 100 and is provided with a display unit and an input device. The management console 14 is coupled with the virtualization switch 11 via a network.

Figure 2:
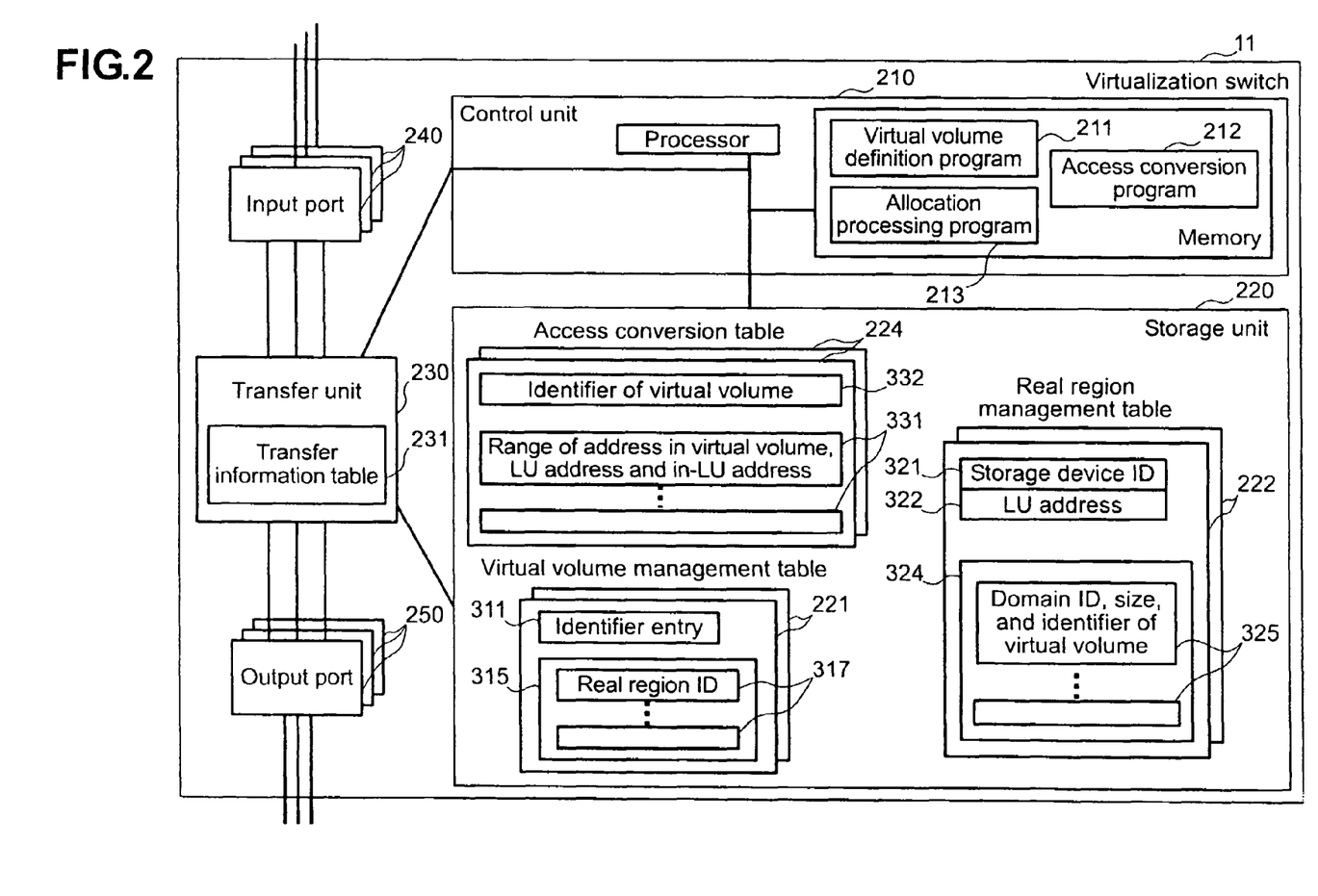
FIG. 2 is a diagram showing an example of internal configuration of a virtualization switch 11.

FIG. 2 is a diagram showing an example of internal configuration of a virtualization switch 11.

The virtualization switch 11 has an input port 240, an output port 250, a transfer unit 230, a control unit 210 and a storage unit 220.

The input port 240 is to be coupled with a communication line that is used by the virtualization switch 11 to communicate with the host processor 12. The output port is to be coupled with a communication line that is used by the virtualization switch 11 to communicate with the storage device 13. Note that a device configuring the input port 240 and a device configuring the output port 250 may be the same hardware. In this case, a user will choose which port should be used as an input port or an output port. The virtual switch 11 has one or a plurality of input ports 240 and one or a plurality of output ports 250.

The transfer unit 230 has a memory and stores a transfer information table 231 in the memory. In the transfer information table 231, information on a matching relationship between the input port 240 and the host processor 12 that can communicate with the virtualization switch 11 via the input port 240, and between the output port 250 and the storage device 13 that can communicate with the virtualization switch 11 via the output port 250 is stored.

The transfer unit 230 transfers, by referring to the transfer information table 231, an I/O request received by the input port 240 from the host processor 12 to the output port that is used for communication between the storage device 13 to which the request is transferred and the virtualization switch 11. Further, the transfer unit 230 transfers answering information or data that is received by the output port 250 from the storage device 13 to the input port 240 that is used for communication between the host processor 12 which should receive such data, etc. and the virtualization switch 11. Incidentally, the I/O request received from the host processor 12 may be an I/O request to the virtual volume 100, to transmit the I/O request to the storage device 13 which will be chosen as a result of executing an access conversion program 212 (to be described later) by the control unit 210. In this case, the transfer unit 230 transfers the I/O request to the output port 250 that is used for communication with the storage device 13.

The control unit 210 has a processor and a memory. The memory stores therein a virtual volume definition program 211, an access conversion program 212 and an allocation processing program 213. These programs are executed on the processor of the control unit 210.

The storage unit 220 stores a virtual volume management table 221, a real region management table 222 and an access conversion table 224.

The access conversion table 224 exists for each virtual volume 100 that is provided by the virtualization switch 11 to the host processor 12. The access conversion table 224 stores one or a plurality of entries 331 and an entry 332 that registers a virtual volume identifier associated with the virtual volume 100. In each entry 331, a virtual address area that indicates a storage area in the virtual volume 100, an LU address which is an identifier to designate the LU 131 to which the appropriate real region 132 for the virtual address area belongs, and an in-LU address which indicates a location of such real region 132 in the LU 131 are associated each other and are registered. More specifically, the access conversion table 224 stores matching information on a virtual address that is used to designate a storage area in the virtual volume 100 and an address that is used to designate a storage area in the storage device 13.

Note that, when such a storage area that the real region 132 is not allocated in the virtual volume 100 exists, a symbol "−1" which indicates that a real region 132 is not allocated as an LU address, or a symbol "−1" which similarly indicates that a real region 132 is not allocated as an in-LU address is registered. The access conversion table 224 is updated by the control unit 210 when the configuration of a storage area of the virtual volume 100 is modified, or more specifically, a modification is made to the real region 132 which is associated with a storage area in the virtual volume 100. The control unit 210 executes the access conversion program 212, and, by referring to the access conversion table 224, converts the I/O request to the virtual volume 100 that is received from the host processor 12 to an I/O request to the LU 131 of the associated storage device 13. In addition the control unit 210 notifies the storage device 13 having the LU 131 which is the target of the converted I/O request to the transfer unit 230. Accordingly, the transfer unit 230 will transfer the converted I/O request via the transfer information table 231 to the output port 250 that is coupled to the storage device 13 to which the notification is issued.

Incidentally, a matching LU 131 may not exist in the storage area in the virtual volume 100 that is designated by the I/O request received from the host processor. In other words, a real region may have not been allocated yet to the storage area in the virtual volume 100 and the symbol "−1" has been registered in the entry 331 of the access conversion table 224 as an LU address and an in-LU address. In this case, the control unit 210 executes the virtual volume definition program 211, and then executes the process to modify the definition of the virtual volume 100.

To attain further performance improvement, the virtualization switch 11 may be provided with the access conversion table 224 and the access conversion program 221 for each input port 240. The real region management table 222 exists for each LU 131. The real region management table 222 is a table used to manage the real region 132 that is contained in the LU 131. In each real region management table 222, a storage device ID 321 an LU address 322 and a real region list 324 are stored.

The storage device ID 321 is an identifier to represent the storage device 13 that has the LU 131. The LU address 322 is an identifier of such LU 131.

The real region list 324 has at least one entry 325. Each entry 325 is provided in association with each particular real region 132 which makes up the LU 131 and has items to register information on a real region ID, a size of real region and a virtual volume identifier. The real region ID is an identifier to identify the real region 132 which associates with the entry 325 and the size is a size of the real region 132. Further, the virtual volume identifier to be registered in the entry 325 is a virtual volume identifier to identify the virtual volume 100 to which the real region 132 is allocated. The entry 325 in the real region list 324 is arranged in the order of addresses of the real region 132.

It should be noted that, since the embodiment assumes that the size of the real region 132 is fixed, an item to register the size of the real region 132 may not be contained in the entry 325. Further, for the unused real region 132, the term "null" that represents the region is unused is registered in the item for registering virtual volume identifiers of the entry 325.

As stated in the above, the real region management table 222 stores information that indicates whether each real region 132 belonging to the LU 131 is used as the virtual volume 100, and the information is used when the virtualization switch 11 is selecting the real region 132 which is newly allocated to the virtualization volume 100.

It should be noted that the real region management table 222 is created based on an instruction by the administrator to be given via the management console 14 at such timing that the storage device 13 is coupled to the virtualization switch 11, for example. Further, at this time, the LU 131, storage capacity of the real region 132 which makes up the LU 131, etc. are determined. It should also be noted that, at a point of time when the real region management table 222 is created, an identifier to be uniquely determined in the virtualization switch 11 is written in the real region ID for all entries 325, and "null" is set up with a virtual volume identifier.

The virtual volume management table 221 exists in each virtual volume 100. In each virtual volume management table 221, an identifier entry 311 and a real region list 315 are stored. In the identifier entry 311, a virtual volume identifier of the virtual volume 100 that associates with the virtual volume management table 221 is registered. The real region list 315 is a list that shows which real region 132 has been allocated to the virtual volume 100 associated with the virtual volume management table 221. In the real region list 315, the matching entries 317 of the real region 132 are arranged in the order of virtual addresses on the virtual volume 100, and in each entry 317, real region IDs of the real region 132 associated with virtual addresses are stored. Out of such virtual volumes 100, in an entry 317 which is relevant to a storage area to which the real region 312 has not been allocated, a "null" value representing a free space is stored instead of the effective real region ID 317.

As stated in the above, the virtual volume management table 221 stores information that shows with which real region 132 the storage area of the virtual volume 100 is associated, and is used when the virtualization switch 11 is used to select the real region 132 that can be released.

Hereinafter, storage area allocation processes executed by the virtualization switch 11 according to the embodiment will be described.

The control unit 210 creates or modifies the definition of the virtual volume 100 by executing the virtual volume definition program 211. The control unit 210, upon receiving a request for creating the virtual volume 100 from the system administrator via the management console 14, executes the virtual volume definition program 211 and newly creates the virtual volume management table 221 and the access conversion table 224. In this case, the control unit 210 creates a virtual volume identifier which is not redundant with other virtual volumes 100 that has already been created, stores the identifier in the identifier entry 311 of the virtual volume management table 221, and initialize the real region list 315 by setting up a null value in each entry 317 in the real region list 315. As stated in the above, right after the creation of the virtual volume 100, the real region 132 is not associated with the virtual volume 100. Therefore, at this time, the control unit 210 registers the virtual volume identifier of such virtual volume 100 in the entry 332 even in the access conversion table 224 associated with the virtual volume 100 to be defined by the newly created virtual volume management table 221. However, in the LU address and the address in the LU of the entry 331, the control unit 210 registers a null value "−1" to initialize the access conversion table 224.

As stated in the above, if the volume management table 221 and the access conversion table 224 are already initialized, when the host processor 12 is coupled to the virtualization switch 11 and issues a command to detect a storage area to the virtualization switch 11, the control unit 210 of the virtualization switch 11 notifies (the host processor 12) that information showing the virtual volume 100 having a predetermined size is accessible from the host processor 12. The information to be notified by the control unit 210 to the host processor 12 contains a virtual volume identifier and the (predetermined) size of virtual volume. However, the status will be such that the real region 132 which is a logical storage of the storage device 13 has not been allocated actually to the virtual volume 100. The virtualization switch 11, then, allocates the real region 132 to the virtual volume 100 at such timing that it receives a request for writing data issued by the host processor 12, etc. As a result, since, when a computer actually issues an access request to a storage device, it is possible to allocate the real region 132 to the computer, and it is not required to allocate the real region 132 to the computer in advance by allowing sufficient capacity, thus enabling to eliminate waste in the storage area to be allocated to the computer.

Figure 3:
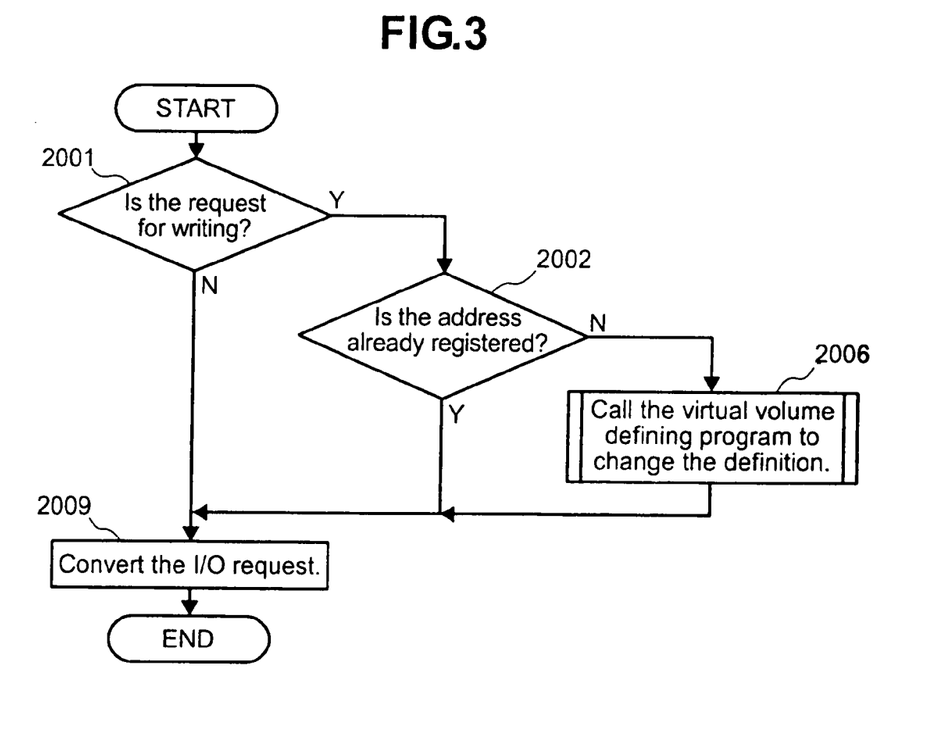
FIG. 3 is a flow chart showing a processing procedure for I/O request of a control unit 210 according to a first preferred embodiment.

When the real region 132 is allocated to the virtual volume 100, the control unit 210 modifies the virtual volume management table 221 according to a request for data writing, etc. from the host processor 12. In this case, the control unit 210 first allocates the real region 132 to the virtual volume 100, and then updates the access conversion table 224. It should be noted that, actually, if the destination of an I/O request received from the input port 240 is the virtual volume 100, the transfer unit 230 transfers the I/O request to the control unit 210. The control unit 210 executes such processes described below as shown in FIG. 3 for the I/O request transmitted. Further, after completing the processes in FIG. 3, the control unit 210 transmits information on the destination of the I/O request thus converted to the transfer unit 230, and the transfer unit 230 transfers the I/O request to each storage device 13 based on the information.

FIG. 3 is a flow chart showing an example of processing procedures performed when the control unit 210 receives an I/O request from the host processor 12.

First, the control unit 210 judges whether an I/O request to the virtual volume 100 that is received from the host processor 12 is a write request (Step 2001).

If the I/O request from the host processor 12 is a write request, the control unit 210 checks, by referring to the access conversion table 224, if the real region 132 is associated with the virtual address of the virtual volume designated by the write request (Step 2002).

If the real region 132 associated with the virtual address of the designated virtual volume 100 is not registered in the access conversion table 224 (i.e. if "−1" is registered in the entry 331, associated with the virtual volume identifier and the virtual address that are contained in the I/O request, of the access conversion table 224 as an LU address and an address in the LU), the control unit 210 executes the virtual volume definition program 211 to execute definition modifying processes of the virtual volume 100.

More specifically, the control unit 210 allocates the real region 132 in the virtual address area of the virtual volumes designated by the I/O request. For this purpose, the control unit first retrieves the real region management table 222 to retrieve an unused real region 132 (i.e. a real region 132 with which a "null" value is registered in the entry 325 of the real region management table 222 as a virtual volume identifier). The control unit 210 then allocates the unused real region 132 thus retrieved to the storage area associated with the virtual address of the virtual volume 100 designated by the I/O request. In other words, the control unit 210, in the real region management table 222, registers a virtual volume identifier contained in the I/O request in the entry 325 associated with the unused real region 132 concerned, and registers a real region ID of the unused real region 132 thus retrieved with the entry 315 of the virtual volume management table 221 associate with the virtual volume identifier contained in the I/O request. Further, the control unit 210, in the access conversion table 224, registers an LU address and an address in the LU of the unused real region 132 thus retrieved with the entry 331 associated with the virtual volume identifier and the virtual address that are contained in the I/O request.

It should be noted that, if the storage capacity of the unused real region 132 thus retrieved is insufficient for the virtual address area of the virtual volume 100 to be designated in the I/O request, the control unit 210 further retrieves the free (unused) real region 132 until the storage capacity satisfies the virtual address area (Step 2006).

Following the process Step 2006, or if it is judged in Step 2002 that the real region 132 associated with the virtual address of the virtual volume designated in the I/O request has been registered, or if it is judged in Step 2001 that the request is not a write request, then the control unit 210, by referring to the access conversion table 224, converts the I/O request for the virtual address of the virtual volume 100 received from the host processor 12 to an I/O request to the real region 132 of the LU 131 of the associating storage device 13 (Step 2009), and terminates the process.

It should be noted that the control unit 210 delivers the converted I/O request to the transfer unit 230, and the transfer unit 230, by referring to the transfer information table 231 based on the storage device 13 which is the destination of the converted I/O request, transmits the converted I/O request to the storage device 13 via the output port 250.

As described in the above, process of step 2006 shown in FIG. 3 enables, when data is being written to the virtual volume 100, to actually allocate to the virtual volume 100 the real region 132 associated with the storage area on the virtual volume to which the data is written. Accordingly, the computer recognizes that a large-capacity storage area (virtual volume) is allocated from the very beginning of initialization, but, actually, it is needed only to allocate the real region 132 having the capacity required by the computer in advance, and such arrangement makes it possible to efficiently allocate a storage area.

Second Embodiment

Next, a second preferred embodiment according to the present invention will be described.

With the first embodiment, no consideration is given to a case where the real region 132 is first allocated to a virtual volume, and then the data stored in the real region 132 will not be used anymore. In this connection, in the second embodiment, consideration will be given to an arrangement, in addition to the arrangement employed in the first embodiment, in which allocation of the real region 132 that is not used any more to the virtual volume 100 will be ceased (hereinafter referred to as "released").

In the embodiment, a defrag processing program 214 is stored in the memory of the control unit 210, in addition to the configuration of the first embodiment. The control unit 210 receives a defrag initiation instruction issued by the system administrator via the management console 14, executes the defrag processing program 214 to re-arrange data such as files stored in the virtual volume 100.

More specifically, the control unit 210 reads management information of a file system stored in the storage device 13. The management information is an aggregate of virtual address lists that show the location on the virtual volume 100 in which data of each file stored in the file system is arranged. Then, the control unit 210, based on the management information of the file system thus read, modifies the arrangement by copying the data in a free area in the real region 132 and rewriting the virtual address stored in the management information from a value indicating the copy source to a value indicating the copy destination so that the data stored in the real region 132 can be stored in a series of storage areas in the virtual volume as much as possible. It should be noted that, in the embodiment, to prevent data corruption caused by applying the re-arrangement process, it is necessary that the system administrator should unmount the file system which is supposed to use the virtual volume 100 concerned before giving the defrag initiation instruction.

Thereafter, the control unit 210 identifies the virtual address area of the storage area, among the storage areas of the virtual volume 100, to which allocation of the real region 132 becomes unnecessary, and releases the real region 132 associated with the identified virtual address range. More specifically, for all files, the storage areas on the virtual volume 100 in which the data is stored are known from the management information of the file system. Therefore, the control unit 210 retrieves the real region 132 which is allocated to the storage area on the virtual volume 100 except such storage areas and those storage areas on the virtual volume 100 in which the management information itself is stored, and releases the real region 132 that is identified by such retrieval. At this time, the control unit 210 registers a "null" value with the entry 317, in the virtual volume management table 221 regarding the virtual volume 100 concerned, in which a real region ID of the real region 132 to be released is registered. In addition, the control unit 210 further registers "−1", as an LU address and an address in the LU, with the entry 331, in the access conversion table 224 that is related to the virtual volume 100 concerned, in which an address in the LU showing the location of the real region 132 to be released in the LU 131. Further, the control unit 210 also updates the real region management table 222, and registers a "null" value as a virtual volume identifier of the entry 325 in which the real region ID of the real region 132 to be released is registered.

Figure 4:
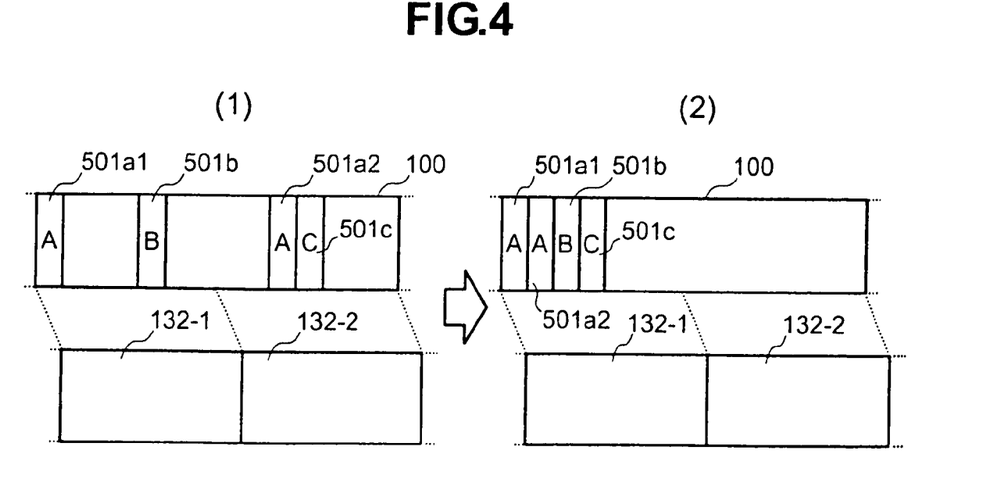
FIG. 4 is a diagram showing an outlined procedure for data relocation according to a second preferred embodiment.

FIG. 4 shows the concept of a procedure for identifying the real region 132 that is unnecessary to be allocated to the virtual volume and becomes releasable, in the second embodiment.

FIG. 4 exemplifies the file arrangement in the virtual volume 100 and a matching relationship between the virtual volume 100 and the real region 132; FIG. 4(1) shows an example of a status before the defrag processing program 214 of the control unit 210 is executed, whereas FIG. 4(2) shows an example of a status after the defrag processing program 214 has been executed.

In FIG. 4(1), three files (File A, File B and File C) are stored in the illustrated range of the storage area of the virtual volume 100. The data of the File A is divided and stored in a storage area 501a1 and a storage area 501a2 in the virtual volume 100A. The data of the File B is stored in a storage area 501b. The data of the File C is stored in a storage area 501c. On the other hand, two real regions 132 (a real region 132-1 and a real region 132-2) are associated with the illustrated range of the storage area of the virtual volume 100.

Here, the control unit 210 re-arranges the Files A, B and C, by executing the defrag processing program 214, so that these files can be stored in the order of addresses in a sequential storage areas in the virtual volume 100.

Accordingly, after the re-arrangement, data of the File A is arranged in the storage area 501a1 and the storage area 501a2, data of the File B is arranged in the storage area 501b and data of the File C is in the storage area 501c sequentially starting from the left (an address located to the left side is supposed to be smaller) of the storage area of the virtual volume 100 as shown in FIG. 4(2). As a result, an aggregate mass of free space appears next to the storage area 501c. It is not necessary to allocate the real region 132 in advance in the free space on the virtual volume. Therefore, in the example shown in FIG. 4(2), it is possible to release the real region 132-2 associated with the free space on the virtual volume.

The control unit 210 retrieves the real region 132 associated with the free space on the virtual volume that appeared after executing the defrag processing program 214 from the virtual volume management table 221. In other words, the control unit 210 retrieves the virtual volume management table 211 to find out a real region corresponding to the virtual address area in the free space, and releases the real region 132 thus found out. More specifically, the control unit 210 deletes the real region ID of the real region 132 to be released from the virtual volume management table 221, registers a "null" value with the entry 317 with which the real region ID was previously registered. The control unit 210 then eliminates a virtual volume identifier, in the real region management table 222, which was associated with the real region 132 to be released, and sets a new "null" value to the entry 325 with which the virtual volume identifier was previously registered. Further, the control unit 210 eliminates identification information (an LU address) of the LU 131 to which the real region 132 to be released belongs and position information (an address in the LU) of the real region 132 to be released in the LU 131, both of which are registered in the access conversion table 224, and sets "−1" instead for the information.

Third Preferred Embodiment

Next, a third preferred embodiment according to the present invention will be described.

In the first embodiment, the size of the real region 132 to be allocated to the virtual volume 100 is fixed. However, for the request for writing data based on a predetermined process, e.g., formatting process, a writing process that uses a comparatively small portion of a storage area will occur. When the fixed-size real region 132 is allocated to the virtual volume 100 as is the case in other embodiments, there will be waste in the allocated storage area. Taken the above into consideration, in the embodiment, the real region 132 that is appropriate to the process will be allocated to the virtual volume 100.

In the embodiment, in addition to the configuration of the first embodiment, a format processing program 215 is stored in the memory of the control unit 210. In addition, the entry 317 of the virtual volume management table 221 contains information indicating the size of the associating real region 132. Further, unlike the first embodiment, the size of the real region 132 contained in the entry 325 of the real region management table 222 will not be omitted in the embodiment. The reason why the size is included in the entry 317 of the virtual volume management table 221 and the entry 325 of the real region management table 222 is to improve allocation efficiency by making the size of the real region 132 variable as stated above.

The control unit 210, by executing the format processing program 215, initializes the file system which uses the virtual volume 100 in place of the host processor, or erases all files and directories on the file system, and establishes a state that enables creating files and directories anew. At this time, the control unit 210 issues an I/O request for writing management data called "meta-data" in the virtual volume 100 to the control unit 210 itself. Note that, the control unit 210 includes a special value, specifically 0xFFFF00, indicating the control unit 210 itself in the transmission source address (specifically, Port ID of Fibre channel) of the I/O request. The size of the meta-data to be written at this time is not so large, but, since the meta-data is written at a regular interval in the storage of the virtual volume 100, if the size of the virtual volume 100 is not large, much meta-data will be written at a regular interval in one virtual volume. Consequently, when the real region 132 which is larger than the meta-data size is allocated each time the meta-data is written in the virtual volume concerned, an unused area in which no data is written will occur within the real region 132 that is allocated to the virtual volume.

Thus, the allocation efficiency of the real region 132 will be deteriorated. Making the size of the real region 132 variable is performed to prevent the allocation efficiency from being deteriorated.

It should be noted that the format processing program 215 is executed based on an instruction issued via the management console 14 from the administrator, etc., or based on an instruction from the host processor 12.

Figure 5:
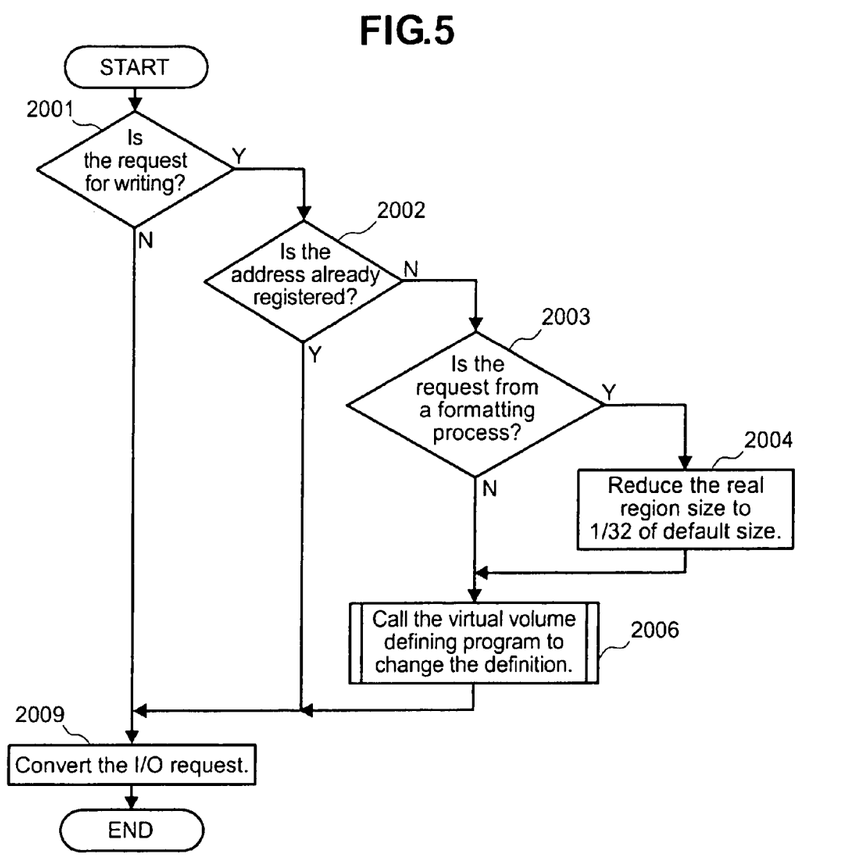
FIG. 5 is a flow chart showing a processing procedure for I/O request of a control unit 210 according to a third preferred embodiment.

FIG. 5 is a flow chart showing an example of processing procedures of the control unit 210 in the third embodiment, describing the case where an I/O request is received from the host processor 12, or the case where an I/O request is created by the control unit 210 itself.

The processing procedures include, in addition to the processing procedures of the first embodiment as shown in FIG. 3, processes to judge whether an I/O request is based on the formatting process (Step 2003), and processes to modify the size of the real region 132 to be allocated to the virtual volume 100 when the I/O request is based on the formatting process (Step 2004). Note that, however, processes of other Steps are similar to those of the first embodiment, and the processes will not be described herein.

When the I/O request to be processed is a write request (the case of "Y" in Step 2001) and the real region 132 that is associated with a virtual address of the virtual volume 100 designated by the I/O request is not registered in the access conversion table 224 (the case of "N" in Step 2002), the control unit 210 judges whether the I/O request is based on the formatting process or not.

More specifically, if the I/O request is created by the control unit 210 itself by executing the format processing program 215, that is, if the transmission source address of the I/O request is a value (0xFFFF00) indicating the control unit 210 itself), the control unit 210 judges the I/O request is based on the formatting process, or otherwise, if the I/O request is received from the host processor 12, the control unit 210 judges the I/O request is not based on the formatting process (Step 2003).

When the I/O request to be processed is based on the formatting process, the control unit 210 designates the size of the real region 132 to be allocated to the virtual volume 100 to be 1/32 of the size of the real region 132 to be allocated to the virtual volume 100 at the time of writing other data. The divisor can be determined randomly by the system administrator. Alternatively, the control unit 210 may directly designate the size of the real region 132 to be allocated to the virtual volume 100 when an I/O request based on the formatting process is available.

Further, the control unit 210 retrieves the unused real region 132 from the real region management table 222 in the similar way to Step 2006 shown in FIG. 3. At this time, if there is no free real region 132 having the designated size, the control unit 210 repeats a process to divide a larger real region 132 into two parts until the unused real region 132 having the designated size is created. The control unit 210, upon finding an unused real region 132 having the designated size, allocates the real region 132 to a virtual volume, and updates the access conversion table 224, the real region management table 222 and the virtual volume management table 221 in the similar way to that described for Step 2006 in FIG. 3.

Figure 6:
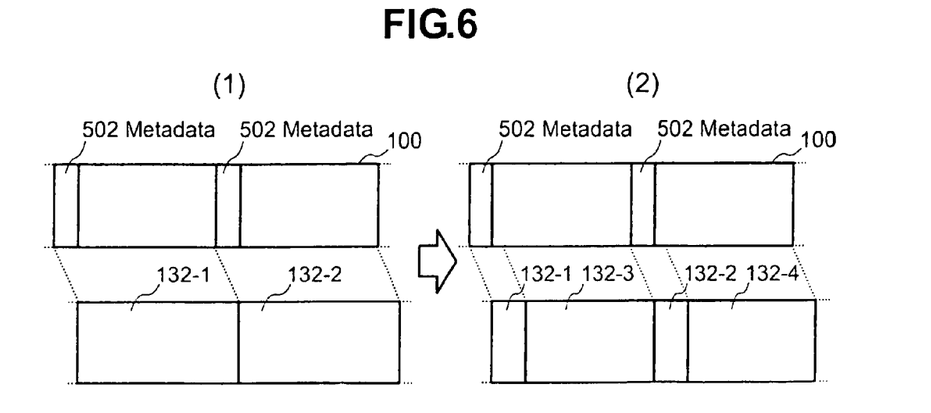
FIG. 6 is a diagram showing an example of formatting process according to the third preferred embodiment.

FIG. 6 is a diagram showing an example of formatting process according to the third embodiment.

FIG. 6 shows matching relationship between the meta-data arrangement of the virtual volume 100 and the real region 132. FIG. 6(1) shows the case where the size of the real region 132 is fixed, while FIG. 6(2) shows the case where the size of the real region 132 is variable.

In both FIGS. 6(1) and 6(2), two meta-data 502 are written for the virtual volume 100.

In FIG. 6(1), since the size of the real region 132 is fixed, it is necessary that the control unit 210 should allocate a real region 132-1 for writing first meta-data and a real region 13202 for writing second meta-data to the virtual volume. As shown in FIG. 6(1), if the size of the meta-data 502 is smaller than that of the real region 132, a free space in which data will not actually be written will appear in the real region allocated to the virtual volume 100, thus impeding effective use of the storage area.

On the other hand, in FIG. 6(2), since the size of the real region 132 is not limited to one and is variable, to write the first meta-data, the real region 132-1 which is smaller than the real region of FIG. 6(1), and to write the second meta-data, the real region 132-2 which is likewise smaller than the real region of FIG. 6(2) are allocated to the virtual volume 100 when the formatting process is executed. As for other parts of the virtual volume 100, a real region 132-3 or a real region 132-4 can simply be allocated when a data write request is actually issued by the host processor. Accordingly, as compared to the case of FIG. 6 (1), a free space is less likely to appear in the real region allocated to the virtual volume.

As stated above, in Step 2004 of FIG. 5, by reducing the size of the real region 132 to be allocated to the virtual volume 100, it is possible to lower the probability to cause a free storage area that will not actually be used in the real region 132 allocated to the virtual volume 100, thus enabling efficient allocation of a storage area.

Fourth Embodiment

Next, a fourth preferred embodiment according to the present invention will be described.

In the embodiment, as is the case with the second embodiment, the control unit 210 retrieves and releases the releasable real region 132 among real regions 132 that are once allocated to the virtual volume 100, provided that, in the embodiment, the control unit 210 uses log information in a journaled file system for the purpose of releasing the real region.

In the embodiment, a journaled file system is used in the host processor 12. Further, in the embodiment, in addition to the configuration of the first embodiment, a journal analysis program 216 is stored in the memory of the control unit 210, and an entry 318 to register a virtual address area of a journal area therewith and an entry 319 to register a duplicated copy of meta-data therewith are contained in the virtual volume management table 221.

In the embodiment, the control unit 210 executes the journal analysis program 216 to analyze information written in a journal area arranged in the virtual volume 100, and releases the real region 132 if any releasable real region 132 is available.

The control unit 210 refers to the entry 318, in the virtual volume management table 221, with which a virtual address range of a journal area is registered to judge if an I/O request is a request for writing in the journal area. If the virtual volume 100 is not formatted as a journaled file system, the virtual address area entry 318 in the journal area in the virtual volume management table 221 is empty (i.e. a "null" value is registered with the entry 318 concerned). When the virtual volume 100 is being initialized as a journaled file system, the administrator writes the virtual address range in the virtual volume, in which a journal of the journaled file system is stored, in the entry 318 of the virtual volume management table 221 via the management console 14. Alternatively, the virtual address range in a virtual volume in which a journal is to be stored may be written in the entry 318 of the virtual volume management table 211 when the format processing program (which is stored in the memory of the control unit 210) of the journaled file system is executed by the control unit 210.

The duplicated entry 319 of meta-data in the virtual volume management table 211 is used when the control unit 210 stores a duplicated copy of meta-data to be stored in the virtual volume 100.

Figure 7:
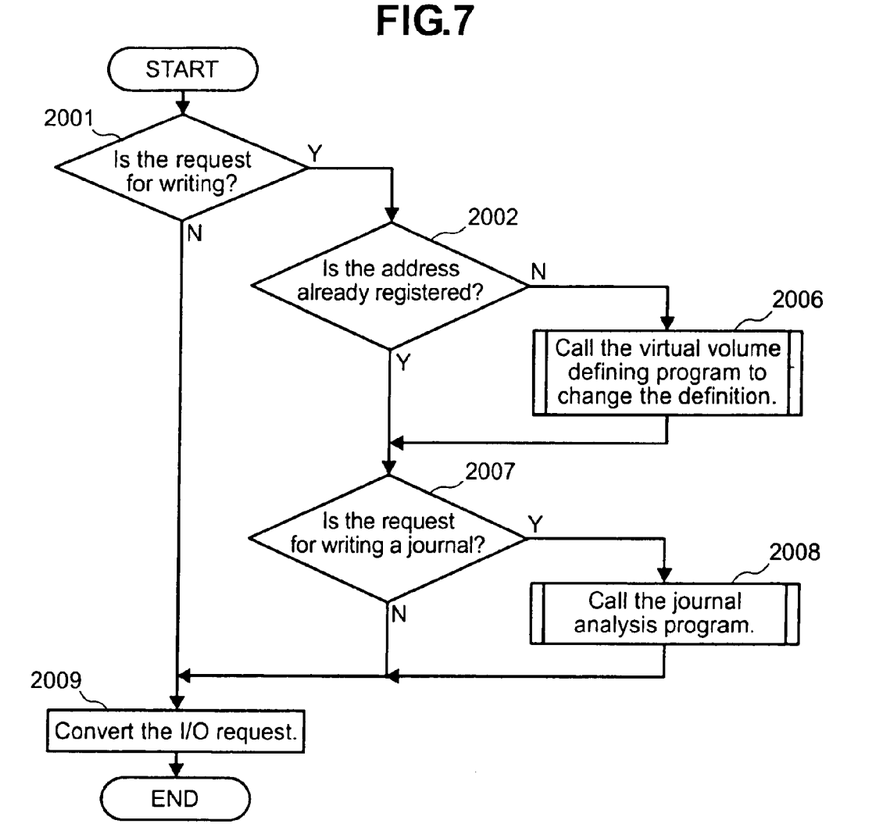
FIG. 7 is a flow chart showing a processing procedure for I/O request of a control unit 210 according to a fourth preferred embodiment.

FIG. 7 is a flow chart, according to the fourth preferred embodiment, showing an example of processing procedures that are executed by the control unit 210 which accepted an I/O request.

In the process, in addition to process shown in FIG. 3 for the first embodiment, the control unit 210 executes a process to judge whether an I/O request is for writing in a journal area (Step 2007) and a process to release a releasable real region 132 (Step 2008).

In Step 2007, the control unit 210 judges whether the write request to be processed is a request for writing in a journal area. At this time, the control unit 210 judges whether the write request is a request for writing in the journal area based on the point whether the write-destination address contained in the write request is contained in the virtual address range registered with the entry 318 of the virtual volume management table 221. If the write-destination address is in the virtual address range registered with the entry 318 of the virtual volume management table 221, the write request should be a write request for the journal area, and the process advances to processing by the journal analysis program 216, or Step 2008.

In Step 2008, the control unit 210 executes the journal analysis program 216 to analyze information to be written in a journal area. Specifically, the information to be written in a journal area implies part of meta-data and offset (in the meta-data) of the part of meta-data in the whole meta-data. Then, the control unit 210 builds meta-data based on the information to be written in the journal area and stores the meta-data in the entry 319 of the virtual volume management table 221.

In the meta-data, matching information between a file on the file system and a virtual address in a memory area on a virtual volume in which the file is stored is contained. Accordingly, the control unit 210, by referring to the meta-data, can identify the virtual address in the storage area in the virtual volume in which the file is not stored. Then, the control unit 210, upon identifying a virtual address range in the memory area on the virtual volume in which the file is not stored (i.e., it is not necessary to allocate the real region 132), retrieves the virtual volume management table 221 based on such identified virtual address range, and identify the real region 132 which matches the virtual address range concerned. Thereafter, the control unit 210, to release the real region 132 thus identified, updates the virtual volume management table 221, the access conversion table 224 and real region management table 222. Note that the updating processes of the virtual volume management table 221, the access conversion table 224 and real region management table 222 will be omitted here since the processes are similar to those described for the second embodiment.

Figure 8:
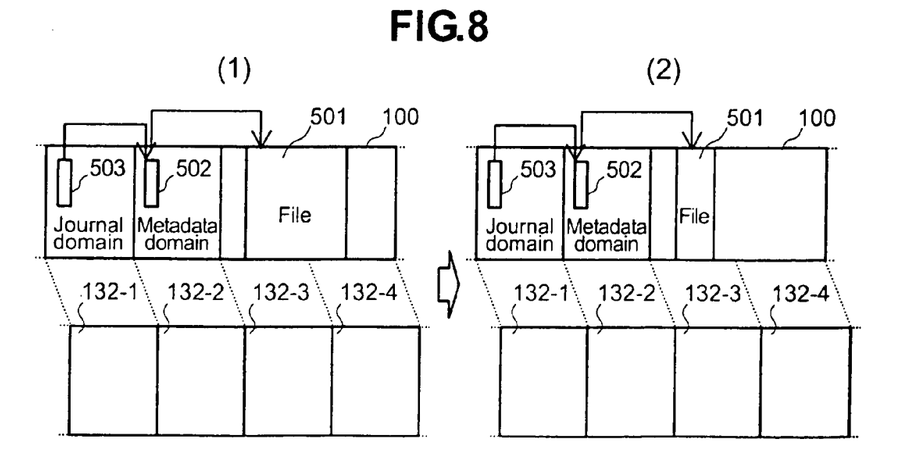
FIG. 8 is a diagram showing a releasing process of a real region 132 according to the fourth preferred embodiment.

FIG. 8 is a schematic diagram illustrating the releasing process of the real region 132 in the fourth embodiment.

FIG. 8 shows arrangements of a journal area, a meta-data area and a file, and a matching relationship between the virtual volume 100 and the real region 132.

FIG. 8(1) shows the status before the size of a file 501 on a journaled file system is reduced, while FIG. 8(2) shows the status after the file 501 is updated and its size is reduced.

In the case where the size of the file 501 is reduced by updating the file, the meta-data 502 that manages the file 501 to be reduced is updated by the host processor when the files are updated. Prior to this process, the host processor 12 writes information in a journal area 503 in the virtual volume 100 to record the detailed process as a journal log. The meta-data 502 is also written in the journal area 503. Therefore, by reading out the meta-data written in the journal area 503, the control unit 210 recognizes, from the meta-data contents, that the file 501 is updated, the size of the file is reduced, and the updated file is stored in the storage area shown in FIG. 8(2).

As a result, in the case of FIG. 8(2), recognizing that the storage area on the virtual volume 100 that corresponds to a real region 132-4 will become empty, the control unit 210 can realize, by using the virtual volume management table 211, that the real region 132-4 which corresponds to the storage area is releasable.

It should be noted that information showing in which storage area in the virtual volume 100 each of all the files 501 in the file system is stored is registered with the meta-data 502. Therefore, the control unit 210 can determine a storage area in empty status in a storage area in the virtual volume 100 based on the information registered with the meta-data 502.

Further, the control unit 210, upon data being written in the journal area 503, stores the latest meta-data developed from data written in the journal area 503 in the entry 319 in the virtual volume management table 221, and releases the real region 132-4 by referring to the latest meta-data stored in the entry 319.

The above-described processes (1) reduction in file size by updating the file 501, (2) writing of information in the journal area 503 as a result of the file update, (3) creation of the latest meta-data based on the data written in the journal area 503 and update of the entry 319 of the virtual volume management table 211 based on the latest meta-data thus created, and (4) release of the real region 132-4 are executed in this order.

It should be noted that writing of the meta-data 502 by the host processor 12 is executed asynchronously with processes by the control unit 210 after completion of writing of information in the journal area 503. Therefore, with the embodiment, the control unit 210 is designed not to read the meta-data 502 that is written by the host processor 12 in the virtual volume 100, but to use such meta-data that is created based on the data written in the journal area 503 and stored in the entry 319 in the virtual volume management table 211.

It should also be noted that, in the above-described fourth embodiment, the description is made by way of example in which the file size is reduced by updating the file, but, in such a case where the real region 132 becomes releasable by deleting the file 501, it is possible to release the real region 132 by taking the similar method. Also in the case where the file 501 is deleted, since the details (meta-data) of the deletion process are recorded in the journal area, the control unit 210 can release the real region 132 in the similar method as stated above.

As stated above, the control unit 210 is able to release the real region 132 that corresponds to the storage area in which data is not actually stored, in a storage area in the virtual volume 100.

Fifth Embodiment

Next, a fifth preferred embodiment according to the present invention will be described.

In the embodiment, the defrag processing program 214, the format processing program 215, etc. which were executed by the virtualization switch 11 in the above-described second and third embodiments are executed by a dedicated computer.

In the embodiment, a dedicated server 15 which is a computer to be coupled to the virtualization switch 11 is added to the configuration of the first embodiment shown in FIG. 1. The dedicated server 15, substituting the control unit 210, executes the defrag processing program 214 and the format processing program 215. The process capacity and the storage capacity of the control unit 210 are limited, and the number of the virtual volumes 100 and the number of associating file system types are also limited. Therefore, the dedicated server 15 is used to act for the control unit 210 to execute defragging and formatting processes.

Accordingly, in the fifth embodiment, the above-described defrag processing program 214 and the format processing program 215 are not stored in the memory of the control unit 210 of the virtualization switch 11, and instead, a server linkage program 217 which is executed so that the control unit 210 can control communication between the dedicated server 15 to be coupled to the virtualization switch 11 and the virtualization switch 11 is stored in the memory.

The control unit 210, when executing the defrag process, executes the server linkage program 217 instead of executing the defrag processing program 214, transmits a defrag process initiation request to the dedicated server 15, and receives a list of emptied storage areas on the virtual volume 100 from the dedicated server 15. Then, the control unit 210 identifies the corresponding real region 132 from the list of emptied storage areas by retrieving the virtual volume management table 221, and releases the real region 132 thus identified.

The control unit 210, when executing the formatting process, executes the server linkage program 217 instead of executing the format processing program 215, and transmits a format process initiation request to the dedicated server 15. Subsequent processes of the control unit 210 are similar to those of the third embodiment.

As stated in the above, with the embodiment, it is possible to reduce processing loads of the virtualization switch 11 by executing the defrag process, the formatting process, etc. at the dedicated server 15. It is therefore possible to increase in the number of the virtual volumes 100 managed by the virtualization switch 11, or the number of file system types that can be handled by the virtualization switch 11.

Sixth Embodiment

Hereinafter, a sixth preferred embodiment will be described with reference to FIGS. 9 and 10.

The embodiment differs from the first embodiment in the point that the virtualization switch 11 reports the total size of the unused real region 132 to the host processor 12. The reasons are as follows:

In the embodiment, information showing that a predetermined size of storage area (virtual volume 100) is allocated to the host processor and becomes usable when the virtual volume 100 is created or started to be used is notified to the host processor 12. Actually, however, the real region 132 is not allocated over the entire virtual volume 100 that is allocated to the host processor concerned. Therefore, when trying to newly allocate the real region 132 to the virtual volume 100 later, for example, at the time of receiving a write request from the host processor, it is likely that the real region 132 having a sufficient size cannot be allocated due to insufficient size of the unused real region 132.

Taking the above into consideration, the embodiment is devised to avoid a situation where an empty real region 132 becomes insufficient at the time of allocating the real region 132 to the virtual volume 100 by enabling the administrator to confirm the total size of the empty (unused) real region 132 that is ready for allocation and by adding a storage device 13, etc.

Figure 9:
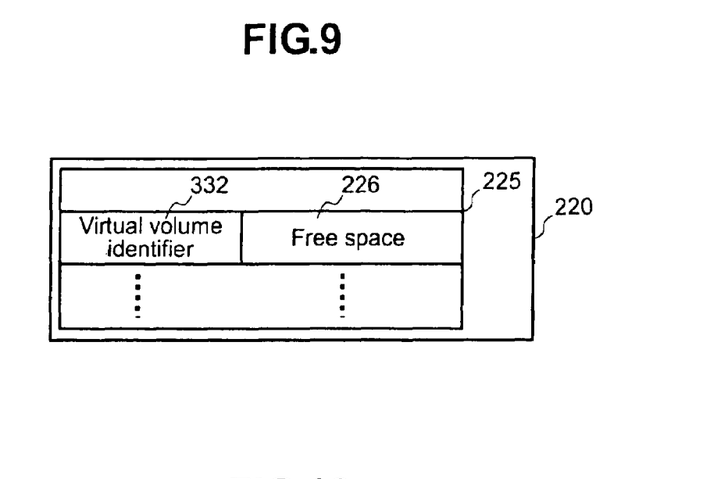
FIG. 9 is a diagram showing a free space management table 225 according to a sixth preferred embodiment.

FIG. 9 illustrates an example of a free space management table 225 the virtualization switch 11 has in the memory apparatus 220.

The free space management table 225 is a table in which a virtual volume identifier 332 and a free space 226 are enumerated. The free space 226 is the total size of empty (i.e., unused) real region that can be allocated to the virtual volume 100 that is identified by a virtual volume identifier paired therewith. The free space 226 is individually set by the system administrator. It should be noted that, in this connection, a value obtained by equally dividing the total size of all the empty real regions 132 that are registered in the real region management table 222 by the total number of the virtual volumes 100 may be set for the free space 226 of the free space management table 225. Alternatively, the free space 226 may be set according to the allocation ratios set by the system administrator for the empty region 132 to each of the virtual volumes 100. To put it simple, methods for setting the free space 226 of each virtual volume 100 may be any method unless the total of the free space 226 exceeds the total size of all the empty real regions 132 that are registered in the real region management table 222.

The free space management table 225 will be designed to be referable as a special virtual volume (hereinafter referred to as a "free space management virtual volume") from the host processor 12, and a virtual volume identifier different from the virtual volume identifier already allocated to the virtual volume 100 (hereinafter referred to as a "free space management virtual volume identifier") will be given as the virtual volume identifier. The host processor 12, by using a command in a format similar to a regular I/O request, designates the free space management virtual volume identifier and transmits a read request of the free space management table 225 to the virtualization switch 11. The virtualization switch, upon receiving the request, returns the content of the free space management table 225.

Note that, the free space management virtual volume identifier is directly written in a free space display program to be described later, or the system administrator writes the identifier in the configuration file on the host processor that is referred to by the free space display program.

In addition, if the virtualization switch 11 and the host processor 12 can communicate with each other via other communication means such as a LAN, the host processor 12 may execute reading of the free space management table 255 according to the communication means.

Figure 10:
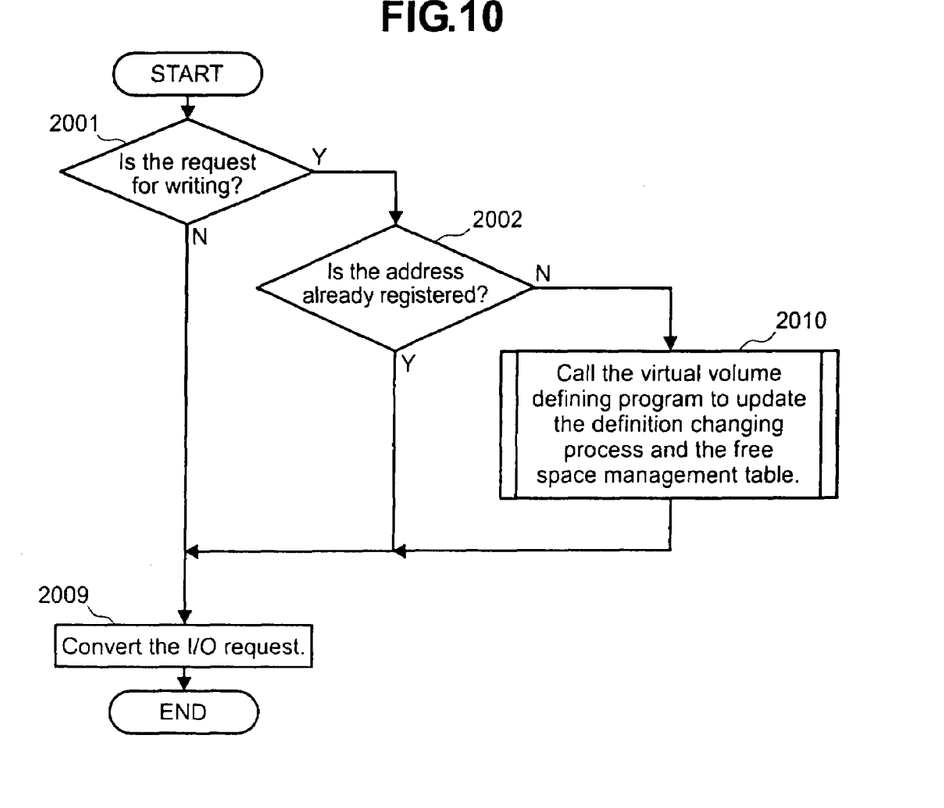
FIG. 10 is a flow chart showing a processing procedures for I/O request of a control unit 210 according to the sixth preferred embodiment.

FIG. 10 is a flow chart showing processing procedures to be executed by the control unit 210 when the unit receives an I/O request from the host processor 12.

In FIG. 10, unlike the processes in FIG. 3, the control unit 210 executes Step 2010 instead of executing Step 2006. In Step 2010, the control unit 210 executes the virtual volume definition program 211, executes definition modification process of the virtual volume 100 as is the case with Step 2006 in FIG. 3, and further updates the free space management table 225.

More specifically, in addition to the process of Step 2006, the control unit 210 retrieves the free space management table 225 to find out the virtual volume identifier 332 of the virtual volume 100 which is the target of the write request. Then, the control unit 210 subtracts, in Step 2010, the total size of the real region 132 allocated to the virtual volume from the value of the free space 226 associated with the virtual volume identifier 332, and writes the value thus obtained back to the free space 226.

On the other hand, the host processor 12 stores the free space display program in the built-in memory. A CPU built in the host processor 12 executes the free space display program to display, for the administrator, the capacity of the real region that can be allocated hereafter to the virtual volume 100 that is used by the host processor 12. For the "capacity of the real region that can be allocated hereafter", among information of free space management table 225, the value of free space 226 of the virtual volume 100 concerned that is received by the host processor 12 from the virtualization switch 11 will be used.

As stated above, with the embodiment, the administrator is able to recognize the total size of the real region 132 that can be allocated to the virtual volume 100.

It should be noted that the method described in the embodiment can also be applicable to the above-described second to fifth embodiments. It should also be noted that, the descriptions in the above-stated first to sixth embodiments have been made by exemplifying the switch as a device to realize virtualization. However, such a device is not limited to the switch, but the device may be another device such as a computer or router.

What is claimed is:

1. A system for storing data comprising:
a plurality of storage systems each of which comprises a controller and a disk;
a management computer for sending information; and
a virtualization apparatus coupled to said plurality of storage systems and said management computer;
wherein said virtualization apparatus comprises:
an input port arranged to be coupled to a computer, said input port including an access conversion table which is arranged to record matching relationships between virtual volumes which are targets of access requests from the computer and storage areas of said plurality of storage systems that are allocated to said virtual volumes after said virtualization apparatus receives an instruction from said management computer;
an output port arranged to be coupled to said plurality of storage systems; and
a control unit that controls said instruction;
wherein said input port is arranged to receive a first write request issued by the computer to a virtual volume, said control unit makes an association between said virtual volume of said first write request and a real storage area in said plurality of storage systems if there is no matching relationship in said access conversion table between said virtual volume of said first write request and said storage areas of said plurality of storage systems, said control unit converts the first write request into a second write request for the real storage area, and said output port transfers said second write request converted based on said access conversion table to the real storage area associated with said virtual volume.

2. A method for storing data in a plurality of storage devices coupled to a virtualization apparatus which is coupled to a computer, comprising the steps of:
issuing, in response to a request from said computer, a notice that a predetermined size of a virtual volume is allocated to said computer,
upon receiving a first access request issued by said computer to said virtual volume, allocating storage areas existing in said plurality of storage devices as at least a portion of said virtual volume,
converting, based on an access conversion table, the first access request received from said computer to a second access request addressed to a storage device having the storage areas allocated to said virtual volume, and
transmitting the second access request to said storage device.

3. A method according to claim 2, wherein
said notice that the predetermined size of a virtual volume is allocated contains a virtual volume identifier of the virtual volume, and a size of said virtual volume,
said first access request contains said virtual volume identifier,
upon receiving said first access request having said virtual volume identifier from said computer, said storage areas existing in said plurality of storage devices are allocated to the virtual volume that is identified by said virtual volume identifier,
the first access request received from said computer is converted to said second access request addressed to said storage device having the storage areas allocated to said virtual volume that is identified by said virtual volume identifier, and
the second access request is transmitted to said storage device having the storage areas allocated to said virtual volume that is identified by said virtual volume identifier.

4. A method according to claim 3, further comprising the steps of:
when the storage areas existing in said plurality of storage devices are allocated to said virtual volume, updating said access conversion table which shows matching relationships between the virtual volume and the storage areas in said plurality of storage devices that are allocated to said virtual volume.

5. A method according to claim 4,
wherein the converting step is performed by referring to the updated access conversion table, to convert the first access request received from said computer into the second access request.

6. A method according to claim 5, further comprising the step of:
releasing allocation of storage areas, among storage areas allocated to the virtual volume, that are no longer being used by said computer.

7. A method according to claim 3, further comprising the steps of:
at the time of writing management data based on initialization of a file system, allocating a storage area having a smaller capacity than the storage area available at the time of receiving an access request from said computer to said virtual volume, and
writing the management data in the storage area thus allocated.

8. A method according to claim 7, further comprising the steps of:
using log information of the file system to identify storage areas that are no longer being used by said computer, among the storage areas that are allocated to the virtual volume.

9. A method according to claim 3, further comprising the steps of:
outputting information that is recorded in a free space management table to said computer, said free space management table having information indicating a capacity of empty storage areas existing in said plurality of storage devices that is ready for allocation to a virtual volume.

10. A method according to claim 9, further comprising the steps of:
updating said free space management table when storage areas existing in said plurality of storage devices are allocated to the virtual volume.

11. A method according to claim 2, wherein
said virtualization apparatus comprises:
an input port, arranged to be coupled to said computer, said input port including said access conversion table which is arranged to record matching relationships between virtual volumes which are targets of access requests from said computer and storage areas of said plurality of storage devices that are allocated to said virtual volumes after said virtualization apparatus receives an instruction from a management computer;
an output port arranged to be coupled to said plurality of storage systems; and
a control unit that controls said instruction.

12. A system for storing data according to claim 1, wherein
said virtualization apparatus is arranged to notify said computer, in response to a request from said computer, of virtual volume identification information to identify said virtual volume and a size of said virtual volume, and
the first write request received from said computer contains said virtual volume identifying information.

13. A system for storing data according to claim 12,
wherein said control unit updates said access conversion table in response to said control unit allocating storage areas existing in said plurality of storage devices to a virtual volume.

14. A system for storing data according to claim 13, wherein
said control unit, by referring to said updated access conversion table, converts the first write request received from said computer to the second write request addressed to the real storage device having the storage areas allocated to the addressed virtual volume.

15. A system for storing data according to claim 13, wherein
said control unit, by updating said access conversion table, releases allocation of a storage area, among those storage areas that are allocated to the virtual volume, that is no longer used by said computer.

16. A system for storing data according to claim 12, wherein
said control unit, when writing management data based on initialization of a file system, allocates a storage area having a smaller capacity than the storage area available at the time of receiving a write request from said computer to said virtual volume, and writes the management data in the storage area thus allocated.

17. A system for storing data according to claim 15, wherein
said control system uses log information of the file system to identify a storage area, among those storage areas that are allocated to the virtual volume, that is no longer used by said computer.

18. A system for storing data according to claim 12, further comprising:
a free space management table in which a capacity of empty storage areas existing in said plurality of storage devices which is ready for allocation to a virtual volume is recorded;
wherein information recorded in said free space management table is output according to a request from said computer.

19. A system for storing data according to claim 18, wherein
said control unit updates said free space management table if said control unit allocates storage areas existing in said plurality of storage devices to a virtual volume.

* * * * *